United States Patent [19]
Yocum

[11] Patent Number: 6,099,070
[45] Date of Patent: Aug. 8, 2000

[54] TRUCK BODY WITH MODULAR CONSTRUCTION AND IMPROVED SUBFRAME SYSTEM

[76] Inventor: Gene Yocum, 15701 Amelung La., Derwood, Md. 20855

[21] Appl. No.: 09/108,241

[22] Filed: Jul. 1, 1998

[51] Int. Cl.[7] ..................................................... B60P 3/12
[52] U.S. Cl. ......................... 296/183; 296/194; 296/37.6
[58] Field of Search ................................. 296/37.1, 37.8, 296/37.14, 37.16, 37.6, 183, 196, 197; 224/404, 539, 542

[56] References Cited

U.S. PATENT DOCUMENTS

| | | |
|---|---|---|
| 2,230,635 | 2/1941 | Alderfer ............................ 296/37.6 X |
| 2,596,478 | 5/1952 | Gerhardt ................................. 296/183 |
| 2,722,352 | 11/1955 | Dehnel . |
| 4,126,349 | 11/1978 | Nelson et al. . |
| 4,635,992 | 1/1987 | Hamilton et al. . |
| 4,789,195 | 12/1988 | Fletcher . |
| 4,830,421 | 5/1989 | Hawelka et al. .................... 296/37.6 X |
| 5,000,502 | 3/1991 | Lyall ................................... 296/37.6 X |
| 5,192,176 | 3/1993 | Roberts . |
| 5,263,761 | 11/1993 | Hathaway et al. . |
| 5,267,773 | 12/1993 | Kalis, Jr. et al. . |
| 5,368,357 | 11/1994 | Kalis, Jr. et al. . |
| 5,383,703 | 1/1995 | Irvine, III . |
| 5,421,645 | 6/1995 | Young . |
| 5,520,316 | 5/1996 | Chen ....................................... 224/539 |
| 5,839,775 | 11/1998 | Young et al. ........................... 296/183 |

FOREIGN PATENT DOCUMENTS 2158783  11/1985  United Kingdom ................... 296/197

*Primary Examiner*—Joseph D. Pape
*Attorney, Agent, or Firm*—Liniak, Berenato, Longacre & White, LLC

[57] ABSTRACT

A modular truck body includes a plurality of separate and independent modular compartments or modules. Each module is attached to vertical members of a corresponding subframe in order to efficiently attach the modules to the truck. In certain embodiments, immediately adjacent modules are not directly affixed to one another, so that one can easily be removed from the truck without affecting other modules thereon.

9 Claims, 4 Drawing Sheets

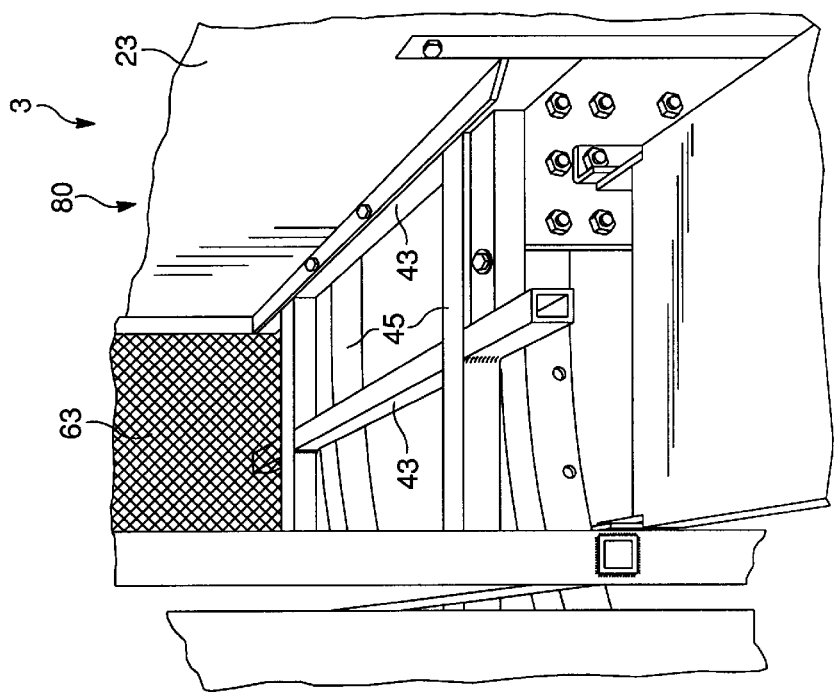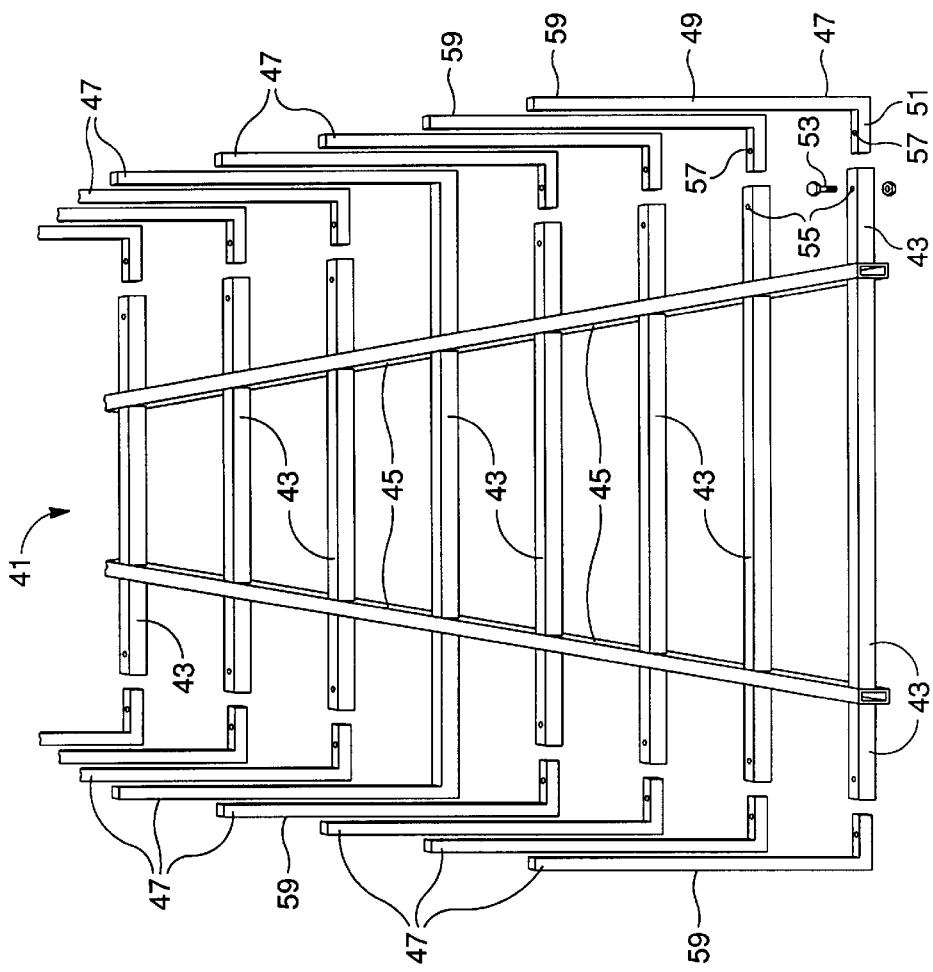

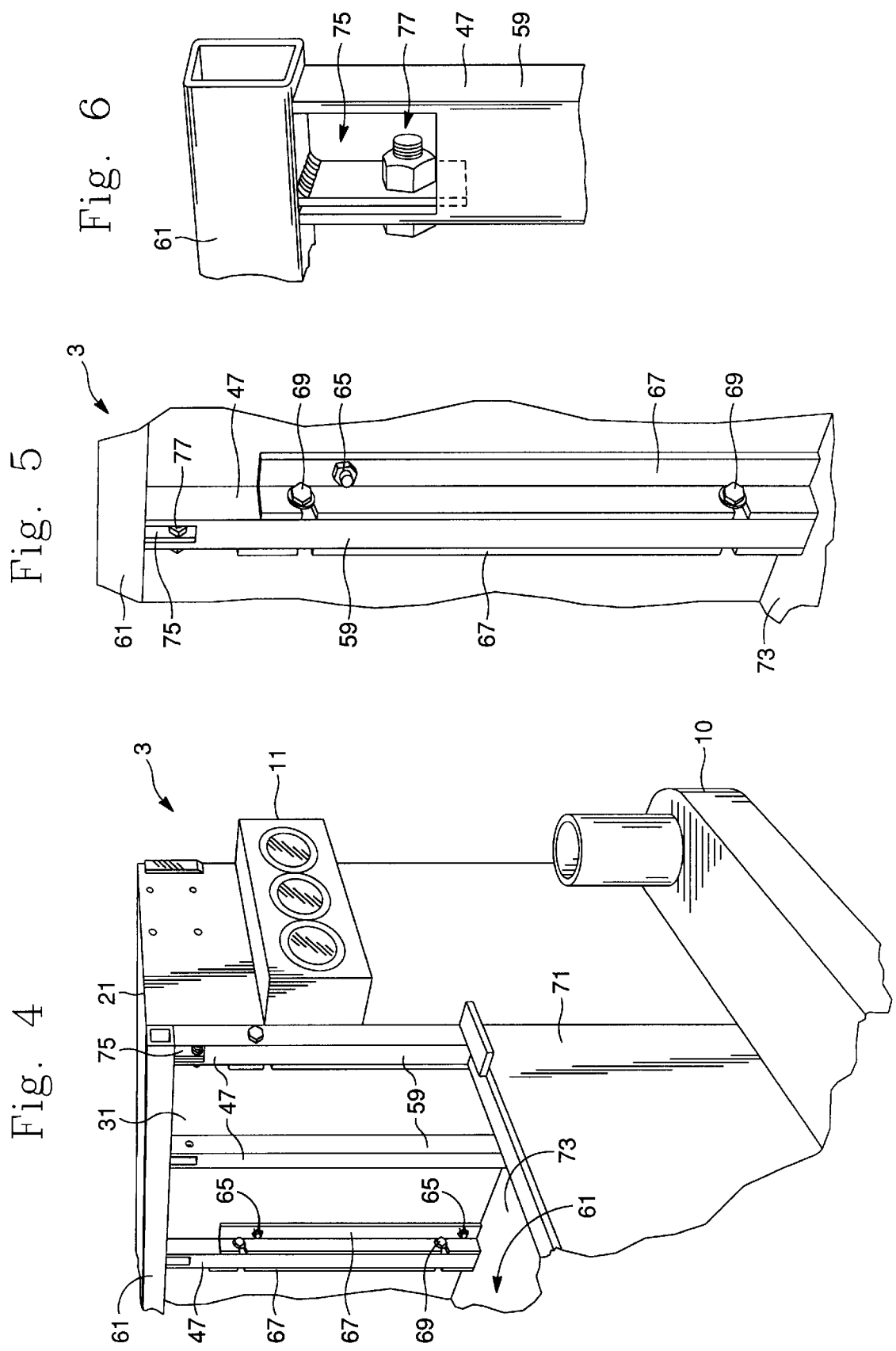

1

TRUCK BODY WITH MODULAR CONSTRUCTION AND IMPROVED SUBFRAME SYSTEM

This invention relates to a truck body with modular construction. More particularly, this invention relates to a modular truck body including an improved subframe assembly, wherein different truck body forms having different numbers and/or configurations of compartments are mounted on certain types of trucks in accordance with the size of the truck and the desires of the user.

BACKGROUND OF THE INVENTION

Truck bodies mountable on trucks are known in the art. For example, see U.S. Pat. Nos. 2,722,352; 4,789,195; 5,267,773; and 5,368,357, the disclosures of which are hereby incorporated herein by reference.

Unfortunately, many conventional truck bodies which are attachable to trucks suffer from at least the following problems. First, most truck bodies are effectively one piece bodies having a fixed size with a given number of compartments for housing tools or the like. There are many differently sized trucks, having different lengths. In view of these variable truck sizes, truck bodies of fixed size are undesirable in that they require marketers and/or sellers of such bodies to maintain in stock many differently sized truck bodies for sale to potential truck owners. For example, a dealer/seller of such bodies may have "in stock" a number of eight foot truck bodies, a number of nine foot bodies, and also a number of eleven foot bodies, due to the variable needs of potential truck owners/body buyers.

Second, most conventional truck bodies have a given number of compartments adapted to house tools, materials, or the like. The size and number of compartments in the body are not variable in a practical sense. Different truck owners have different needs, with some owners requiring a given amount of space for tool storage or the like, and other owners requiring less or more space. Truck bodies having a fixed number of compartments (or storage space) are thus undesirable in this regard.

U.S. Pat. Nos. 4,126,349 and 5,421,645 disclose modular truck bodies, and are hereby incorporated herein by reference. The '349 and '645 patents, however, are undesirable in that the bodies and compartments thereof are inefficiently mounted on the truck. The '349 patent, for example, includes a plurality of different storage modules/cabinets that are attachable to the truck. Horizontally oriented joists, which are part of a frame, are provided for supporting the plastic modules/cabinets. Cantilever end portions of the horizontal joists provide support for the upright end walls of the modules/cabinets. The horizontal joists extend through recesses in sidewalls of the modules/cabinets in order to support same. This is an inefficient way to mount such modules/cabinets on the truck. As a result, this method of attachment further requires metal straps or bars to properly/securely attach the modules/cabinets to the frame. Still further required in the '349 patent are bolts extending between adjacent module end walls to fixedly connect immediately adjacent modules to one another, which in effect causes the entire body to behave during use as a single truck body unit. This rigid connection between adjacent modules also makes it difficult and burdensome for a truck owner to easily remove a single module and, for example, replace it with another.

Single unit truck bodies, and those which perform in effect as single unit bodies during truck operation as in the '349 patent, are undesirable in that they are subject to a high amount of stress in that the body is not, in and of itself, sufficiently flexible. This lack of flexibility during truck operation (e.g. during off road driving) may tend to cause cracking or failure of the body in certain instances. Additionally, such one-piece bodies are often tough on the frame or body of the underlying truck. This reduces the life expectancy of the truck body as well as potentially parts of the underlying truck.

It is apparent from the above that there exists a need in the art for a truck body system which: (i) is modular in nature in that a plurality of different individual modules/compartments may be separately attached/removed without affecting other modules; (ii) is efficiently connectable to the underlying truck via a subframe system to enable simple attachment and removal of individual compartment modules; and (iii) is sufficiently flexible during off-road truck driving and the like so as to reduce stress relative to one-piece bodies.

It is a purpose of this invention to fulfill the above described needs in the art.

IN THE DRAWINGS

FIG. 2 is an exploded perspective view of a portion of the subframe system used in FIG. 1, which enables the modules of the truck body to be mounted on the truck itself, this drawing illustrating the vertical subframe members and the lower horizontally oriented subframe member(s)/portion(s).

FIG. 3 is a perspective view of an area of the FIG. 1 truck located just behind the driver's door and forward of the truck body modules, this figure showing a portion of the FIG. 2 subframe system, and a front wall of a front-most module.

FIG. 4 is a perspective view of a rear corner of the FIGS. 1–3 truck with body mounted thereon, this view also showing the bed area which is positioned between the left hand and right hand modules.

FIG. 5 is a perspective view of one of the vertical subframe members of the subframe of FIGS. 1–4, with a compartment module being affixed to the vertical subframe member via a pair of L-shaped brackets provided on either side of the vertical subframe member.

FIG. 6 is a close-up perspective view of the area of the FIG. 5 vertical subframe member where the vertical subframe member is rigidly connected to a corresponding upper horizontal subframe member.

SUMMARY OF THE INVENTION

Figure 1:
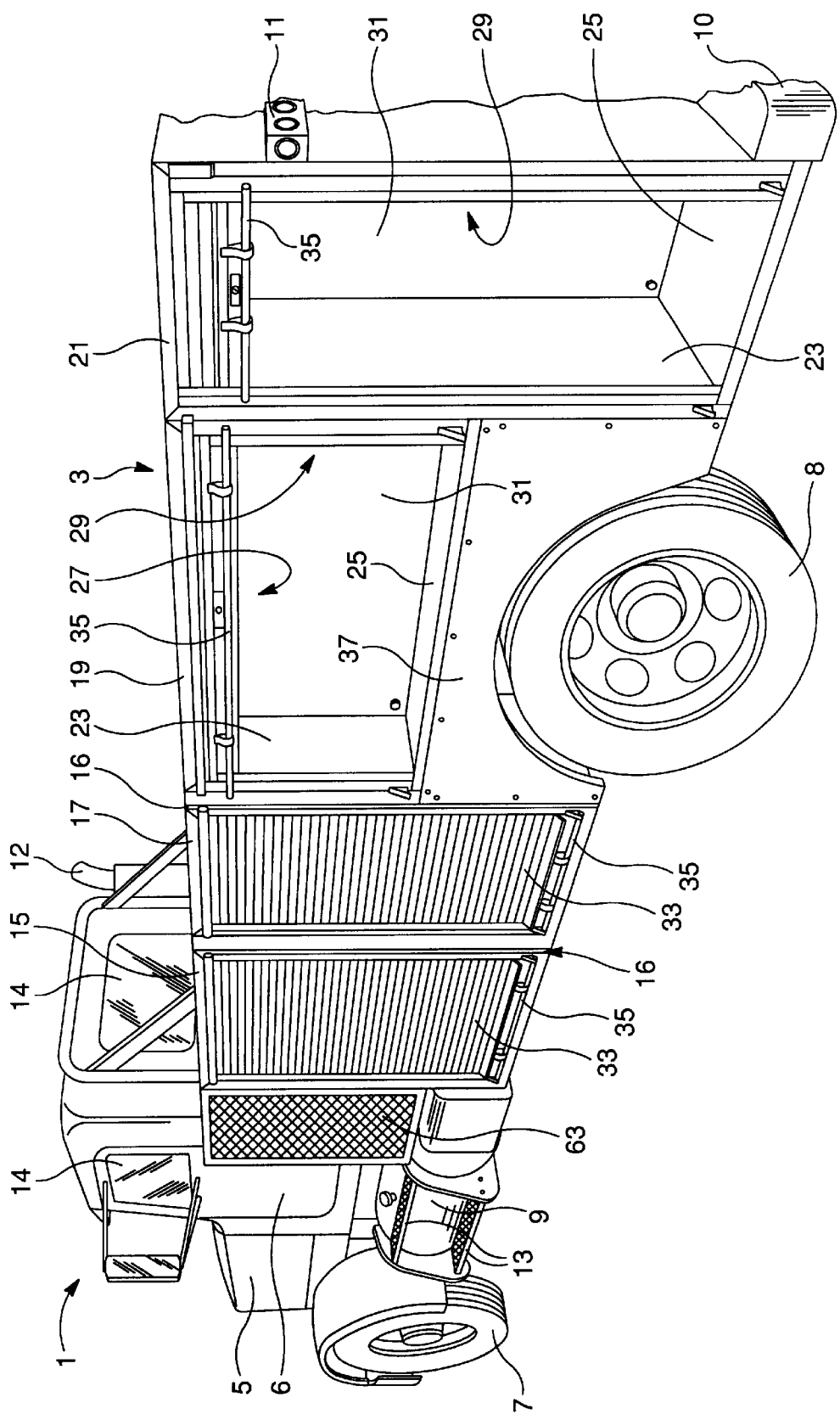
FIG. 1 is a perspective view of a truck including a modular truck body mounted thereon according to an embodiment of this invention.

It is an object of this invention to provide a modular truck body adapted to be mounted on a truck, wherein the body includes a plurality of separate and distinct modules (or compartments) which are independently removable and attachable to the truck via a subframe.

It is another object of this invention to provide a modular truck body wherein immediately adjacent modules are not directly or rigidly affixed to one another, so that the overall body is flexible to a sufficient degree during off-road driving of the underlying truck in order to reduce the amount of stress on the truck and/or the truck body itself relative to single piece bodies. In other words, immediately adjacent modules can tilt and otherwise move/shift relative to one another during operation and driving of the truck.

Another object of this invention is to provide an efficient subframe system enabling modules of a modular truck body to be efficiently and easily removable and mountable on the subframe of the truck body system without disturbing other modules.

Generally speaking, this invention fulfills the above-described needs in the art by providing a modular truck body comprising:

a subframe including a plurality of parallel approximately upright members; and a plurality of separately formed compartment modules, wherein each of said modules is supported by at least one corresponding upright member so that each of said modules can be removed from the subframe without disturbing other modules.

This invention further fulfills the above-described needs in the art by providing a modular truck body adapted to be mounted on a truck, the modular truck body comprising:

a subframe including a plurality of elongated parallel cross members, at least one elongated member at least partially extending between said cross members, and a plurality of upright members operatively connected to corresponding cross members, wherein said upright members are one of (a) integrally formed with corresponding cross members, and (b) formed separately from corresponding cross members;

a plurality of separately formed and independent compartment modules, each of said modules being supported by at least one corresponding vertical member; and wherein first and second immediately adjacent modules are not directly connected to one another.

This invention will now be described with respect to certain embodiments thereof, in view of the accompanying drawings.

DETAILED DESCRIPTION OF CERTAIN EMBODIMENTS OF THIS INVENTION

Referring now more particularly to the accompanying drawings in which like reference numerals indicate like parts throughout the several views.

FIG. 1 is a perspective view illustrating motorized truck 1 including modular truck body 3 mounted thereon, in accordance with an embodiment of this invention. Truck 1 includes cab 5, driver's door 6, front steering wheels 7, rear drive wheels 8, gas tanks 9, rear bumper 10 (optionally modular as will be discussed below), rear or tail lights 11, exhaust discharge 12, step portions 13 on each side of the cab, and windows 14. Modular truck body system 3 is mounted to truck 1 by way of a subassembly frame (i.e. subframe) which is illustrated in detail in FIGS. 2–6.

Referring to FIG. 1, modular truck body system 3 includes separately formed and independently attachable/removable compartment modules 15, 17, 19, and 21 on the left hand side of the truck, and preferably a similar number of similar modules/compartments on the right hand or opposite side of the truck. Thus, only the left hand modules 15, 17, 19, and 21 are shown in FIG. 1, while it is understood that similar right hand modules 15, 17, 19, and 21 are provided on the other side of the truck. Each module or compartment 15, 17, 19, and 21 is adapted to house tools or any other device(s) or material(s) which the truck owner may choose to store or transport therein.

In certain embodiments, each module 15, 17, 19, and 21 includes a front vertical wall 23 which is closest to the front of the truck, a bottom wall 25 approximately parallel (i.e. parallel plus or minus about ten degrees in any direction) to and closest to the ground, a top wall 27 which is approximately parallel to the corresponding bottom wall and which is furthest from the ground, a rear vertical wall 29 which is approximately parallel to the corresponding front wall 23 and closest to the rear of the truck, a vertical interior wall 31 which is furthest from the door of the module/compartment, and a vertical door (e.g. vertical sliding or hinged door) 33 having at least one handle 35 for gripping by an operator or truck owner. Each module, including the walls thereof, is made of a metal (e.g. stainless steel or aluminum) in certain embodiments, although it is possible to make the modules of other suitable material such as fiberglass. Module doors 33 which slide up and down in certain embodiments are advantageous in traffic type environments on the sides of roads and the like, as there are no protruding or swinging doors which project outward from the truck body. Still further, shelves, drawers, or the like may be built within select modules according to alternative embodiments herein, in order to efficiently house tools and the like.

Another advantage associated with this invention is that for trucks having protruding fuel tanks or the like which are obstructions for conventional truck bodies, the system of the instant invention may be easily adapted to such a truck as only one module on each side needs to be modified to fit over or around the fuel tank.

Doors 33 of compartments 15 and 17 are shown in the down or closed position in FIG. 1, while doors 33 of compartments 19 and 21 are shown in the up or open position. When in the closed position, each door 33 is approximately parallel to the corresponding interior wall 31 of the module/compartment. It is further noted that a wheel well portion (which may or may not include an accessible compartment in different embodiments) may be provided and attached to the truck body subframe over each rear wheel on each side of the truck. FIGS. 2–7 also illustrate the FIG. 1 embodiment of this invention, from different perspectives/positions.

Referring to FIGS. 1–7, the modules/compartments 15, 17, 19, and 21 are separate and independent from one another. They are not integrally formed with one another. Thus, single module(s) may be independently removed from the truck body 3 (i.e. taken off the truck) without disturbing the other modules. Because of the independent nature of the different modules/compartments, different sized truck bodies may also be formed for different sized trucks or for truck owners with different needs. For example, a truck body including modules 15, 17, 19, and 21 on each side of the truck may be provided to form an eleven foot long truck body mountable on certain sized trucks. Alternatively, a shorter truck body (e.g. nine foot long body) may be formed and mounted on a shorter truck, such a body including only modules 15, 17, and 19 on each side, but not modules 21. Still further, an ever shorter truck body (e.g. eight foot truck body) may be assembled and mounted on a shorter truck by utilizing modules 17, 19, and 21 on each side of the truck, but no modules 15. In certain other embodiments, modules 15, 19, and 21 may be provided on each side of the truck, but no modules 17 on either side.

In such a manner, the modular nature of the truck body system enables the forming of different sized truck body systems utilizing the same basic modules/compartments and a similar subframe. Thus, marketers or sellers of such truck bodies would no longer need to keep in stock different sized truck bodies, but instead would only need the different modules 15, 17, 19, and 21 for each side of the truck so that different sized truck bodies could be formed and sold to selecting customers. However, it is noted that subframe systems of different length may be kept in stock (e.g. eight, nine, and eleven foot long subframe systems) in order to accommodate the different sized truck body systems.

In certain embodiments of this invention, compartment modules 15, 17, 19, and 21 (on each side of the truck) are not directly rigidly connected to one another with any fasteners (e.g. bolts or screws), or the like. Instead, the modules are only rigidly affixed to the subframe of FIG. 2. This enables individual modules to be easily independently removed (or added) from the truck without disturbing the other modules. Thus, a truck owner may get home at night and decide that he wants to remove module 17 (and its tools housed therein) and transport it into his garage to use the tools to work on his car. In such a scenario, the owner (i.e. user) simply places a dolly under the module to be removed, lowers the air suspension of the truck, and unfastens module 17 from the subframe via fasteners 65 thereby allowing it to be supported on the dolly, and then moves the dolly with module 17 thereon away from the truck and into the garage. In certain embodiments of this invention, immediately adjacent modules (e.g. modules 15 and 17) are not rigidly affixed to one another and are separated from each other by a thin sheet of plastic or insulation 16 disposed therebetween. The flexible sheet member 16 between adjacent modules enables the adjacent modules to flex or move/tilt relative to one another to a sufficient degree during off road driving of the truck to reduce stress on the overall truck body system in such applications. Sheets 16 may be from about 0.125 to 0.250 inches thick in certain embodiments, preferably about 0.1875 inches thick.

FIG. 2 illustrates a portion of subframe system 41 which is utilized to attach the modules/compartments to the truck. The subframe system cannot be seen in FIG. 1. Subframe system 41 includes lower horizontally oriented section (or base portion) including lower horizontally oriented approximately parallel cross members 43 and lower horizontally oriented elongated members 45 which intersect members 43 at an angle (e.g. from about 75–105 degrees) relative thereto. This lower horizontally oriented section is approximately parallel to the ground when the truck is driving on flat surfaces. Also shown in FIG. 2 are a plurality of approximately parallel (parallel plus or minus about 10 degrees in any direction) vertical members 47 of subframe system 41. Vertical subframe upright members 47 extend vertically upward from horizontal members 43 in certain embodiments. Vertical members 47 are oriented approximately vertically relative to the ground when the truck is on a flat or level surface. Each rigid upright or vertical member 47 includes an elongated vertical section 49 and a shorter horizontal section 51 ("horizontal" means approximately horizontal in any direction relative to the ground). Sections 51, which are shorter than vertical sections 49, interconnect with corresponding subframe cross members 43. For example, as shown in FIG. 2, portions 51 may be sized so as to slide into corresponding members 43, with corresponding members 43 and 47 then being rigidly affixed to one another by way of fasteners such as bolts 53 which extend through apertures 55 and 57 in rigid members 43 and 47, respectively. As will be described hereinafter, the modules/compartments are affixed to exterior sides 59 of corresponding vertical members 47, so that a bed area 61 (see FIG. 4) is defined along a central area of the truck between the opposing modules and between the vertical members 47 on the opposite sides of the truck [different types of cargo may be hauled in the bed area]. Vertical members 47 need not be affixed to each member 43 along the entire length of the subframe, but instead only need be affixed to members 43 where modules are to be affixed. Vertical members 47 preferably extend below the members 43 a sufficient distance to support the full height of the box 80. Thus, near the compartments (see FIG. 3) behind the cab of the truck, no vertical members 47 need be provided because no modules are located in this area(s) in certain embodiments of this invention.

Subframe members 43, 45, and 47 may be made of hollow or tubular rigid metal elongated members. Additionally, subframe system 41 may also include upper horizontal rigid tubular members 61 (on each side of the subframe), which are affixed to the upper ends of members 47 as shown in FIGS. 4–6. Subframe members 43 may be square hollow metallic tubing of the 1.75" size in certain embodiments, and the overall subframe shown in FIG. 2 may be from about 9–14 feet long from front to back in certain embodiments of this invention depending upon the length of the truck body and the number of modules to be mounted thereon.

It is noted that vertical members 47 may be welded to or integrally formed with corresponding horizontal cross members 43 in different embodiments of this invention. Also, while members 45 are welded to members 43 in certain embodiments, they may be rigidly connected thereto by any other suitable means. In preferred embodiments, vertical subframe members 47 are removably attached to corresponding horizontal subframe members 43 so that when the vertical members are removed the subframe is useable as a flat bed type device.

FIG. 3 illustrates an open area between the cab of the truck and the most forward module 15. The interior of module 15 is on the opposite side of wall 23 from the side of wall 23 shown in FIG. 3. This open area may be enclosed by screen or other types of doors 63 so that the owner can store equipment in this area. The area is encompassed by screens/doors 63, the forward wall 23 of module 15, and the rear wall of cab 5. Only the interior screen 63 is shown in FIG. 3, while the driver's side screen door 63 for the area is shown in FIG. 1.

FIG. 4 illustrates a rear corner of the FIG. 1 truck. As illustrated in FIG. 4, the rear right hand module 21 is affixed to at least one corresponding vertical subframe member 47 by way of fasteners 65 and L-shaped bracket(s) 67. At least one, and preferably at least two, vertical subframe member(s) 47 is/are provided with a pair of opposing vertical L-shaped brackets 67 rigidly affixed thereto via fasteners 69. Module 21 is then rigidly directly connected to brackets 67 via fasteners 65, so that the vertical members 47 support the modules. Fasteners 65 extend through an elongated portion of a corresponding bracket 67 as well as through an interior wall 31 of the module. FIG. 5 is a close-up view illustrating module 21 being connected to a vertical member 47 of the subframe in the FIG. 4 manner. All of the other modules 15, 17, 19, and 21 are attached to the truck in a similar manner via the subframe and brackets 67.

Also shown in FIG. 4 is a rear bed door 71 which encloses bed area 61. The bottom of the bed area 61 is defined by flooring 73 which is laid on and affixed to the upper sides of rigid horizontal subframe cross members 43. Furthermore, light assembly 11 may be affixed to the rear wall of module 21 on each side of the truck and/or to the adjacent vertical member 47 of the subframe assembly. It is pointed out that rear bumper 10 may be affixed to the system by being connected to the horizontal portion of the subframe (i.e. the bumper may be connected to 43 and/or 45), in order to integrate the system. When bumper 10 is modular, this enables various types of machinery (e.g. a crane) to be attached to the rear of the subframe assembly when the bumper is removed (the bumper could then even be plugged into the rear end of the crane in certain embodiments).

FIG. 6 is a close-up illustrating a cutout or aperture 75 which may be provided near the top of each vertical member 47. This cutout need only be provided in one of the four vertical walls of each member 47. The cutout/aperture 75 is provided in order to allow access to fastener 77 which is used to rigidly affix the horizontal upper member 61 to the vertical member 47. A member 61 may be affixed along each side of the system to all of the adjacent members 47 in a similar manner. It is noted that fasteners 77 (and certain other fasteners herein) may be replaced with welds or any other type of rigid connection mechanism in certain embodiments of this invention.

Figure 7:
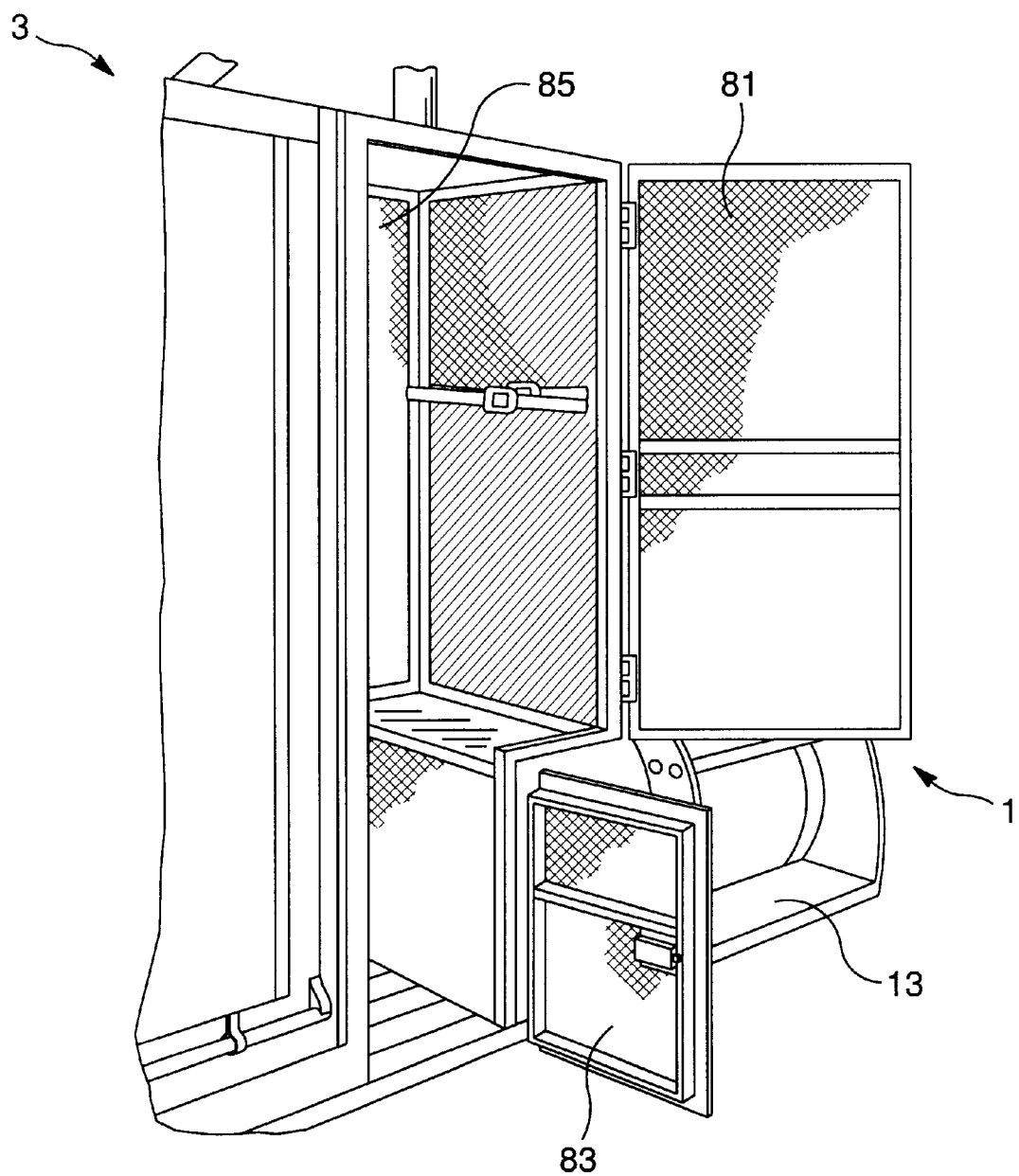
FIG. 7 is a perspective view taken from the opposite side of the truck as FIG. 1, with this view illustrating the compartment area located behind the passenger's door and forward of the front of the forward-most module.

FIG. 7 illustrate a storage area on the passenger's side of the truck similar to the FIG. 3 storage area. Screen doors 81 and 83 may be used to selectively enclose the storage area. Again, this storage area is encompassed between the rear of the cab, interior screen 85, doors 81, 83, and the front wall of the most forward module.

Once given the above disclosure, many other features, modifications, and improvements will become apparent to the skilled artisan. Such other features, modifications, and improvements are therefore considered to be a part of this invention, the scope of which is to be determined by the following claims.

I claim:

1. A modular truck body system for attachment to a truck, the modular truck body system comprising:

a subframe including a horizontally oriented portion and a plurality of vertically aligned members, said horizontally oriented portion to be oriented approximately parallel to a surface upon which the truck is located, and said vertically aligned members extending upward from said horizontally oriented portion;

a plurality of separate and independent modules, each of said modules including walls and a compartment area within said walls;

each of said modules being removably connected to at least one of said vertically aligned members so that each of said modules is individually removable from said subframe;

wherein said horizontally oriented portion of said subframe includes a plurality of approximately parallel cross members and at least two elongated members each of which is attached to each of said cross members;

wherein each of said vertically aligned members of said subframe is removably connected to a corresponding one of said cross members; and wherein each of said vertically aligned members is L-shaped and includes a vertically aligned portion of a first length and a horizontally aligned portion of a second length to be connected to one of said cross members, wherein said first length is substantially greater than said second length.

2. The modular truck body system of claim 1, wherein each of said vertically aligned members is an elongated metal tubular member.

3. The modular truck body system of claim 1, further comprising flooring which is affixed to a top of said horizontally oriented portion of said subframe.

4. A modular truck body system for attachment to a truck, the modular truck body system comprising:

a subframe including a horizontally oriented portion and a plurality of vertically aligned members, said horizontally oriented portion to be oriented approximately parallel to a surface upon which the truck is located, and said vertically aligned members extending upward from said horizontally oriented portion;

a plurality of separate and independent modules, each of said modules including walls and a compartment area within said walls;

each of said modules being removably connected to at least one of said vertically aligned members so that each of said modules is individually removable from said subframe;

wherein immediately adjacent one of said modules are not directly connected to one another so that immediately adjacent modules can flex or move relative to one another to a degree sufficient to reduce stress on the overall truck body system; and a planar flexible sheet disposed between first and second immediately adjacent modules.

5. A modular truck body system for attachment to a truck, the modular truck body system comprising:

a subframe including a horizontally oriented portion and a plurality of vertically aligned members, said horizontally oriented portion to be oriented approximately parallel to a surface upon which the truck is located, and said vertically aligned members extending upward from said horizontally oriented portion;

a plurality of separate and independent modules, each of said modules including walls and a compartment area within said walls;

each of said modules being removably connected to at least one of said vertically aligned members so that each of said modules is individually removable from said subframe; and a plurality of L-shaped brackets for use in connecting said modules to corresponding vertically aligned members.

6. A modular truck body system for attachment to a truck, the modular truck body system comprising:

a subframe including a horizontally oriented portion and a plurality of vertically aligned members, said horizontally oriented portion to be oriented approximately parallel to a surface upon which the truck is located, and said vertically aligned members extending upward from said horizontally oriented portion;

a plurality of separate and independent modules, each of said modules including walls and a compartment area within said walls;

each of said modules being removably connected to at least one of said vertically aligned members so that each of said modules is individually removable from said subframe; and wherein a plurality of said modules include vertically sliding doors which do not substantially protrude outwardly from the modules.

7. A modular truck body system for attachment to a truck, the modular truck body system comprising:

a subframe including a horizontally oriented portion and a plurality of vertically aligned members, said horizontally oriented portion to be oriented approximately parallel to a surface upon which the truck is located, and said vertically aligned members extending upward from said horizontally oriented portion;

a plurality of separate and independent modules, each of said modules including walls and a compartment area within said walls;

each of said modules being removably connected to at least one of said vertically aligned members so that each of said modules is individually removable from said subframe;

wherein said subframe further includes first and second upper elongated rigid members which are connected to top areas of said vertically aligned members, and wherein said first and second upper elongated rigid members area approximately parallel to said horizontally oriented portion of said subframe; and wherein each of said vertically oriented members of said subframe includes an aperture defined in an upper portion thereof in a vertical wall thereof proximate fastening means that connects the vertically oriented member to one of said upper elongated rigid members.

8. A modular truck body adapted to be mounted on a truck, the modular truck body comprising:

a subframe including a plurality of rigid parallel cross members, at least one elongated member at least partially extending between said cross members, and a plurality of upright members operatively connected to corresponding cross members, wherein said upright members are one of (i) integrally formed with corresponding cross members, and (ii) formed separately from corresponding cross members;

a plurality of separately formed and independent compartment modules, each of said modules being supported by at least one corresponding vertical member;

wherein first and second immediately adjacent modules are not directly connected to one another;

wherein said cross members are welded to said at least one elongated member, and wherein said upright members are oriented substantially vertical relative to a flat surface upon which the truck is adapted to travel; and wherein each of said upright members is approximately L-shaped and includes a first portion that is approximately coaxial with a corresponding cross member and affixed to the corresponding cross member and a second portion which is approximately orthogonal to said first portion.

9. A modular truck body adapted to be mounted on a truck, the modular truck body comprising:

a subframe including a plurality of rigid parallel cross members, at least one elongated member at least partially extending between said cross members, and a plurality of upright members operatively connected to corresponding cross members, wherein said upright members are integrally formed with corresponding cross members;

a plurality of separately formed and independent compartment modules, each of said modules being supported by at least one corresponding vertical member;

wherein first and second immediately adjacent modules are not directly connected to one another; and wherein a bumper is directly affixed to said at least one elongated member that extends between said cross members.

* * * * *